(12) United States Patent
Clayton et al.

(10) Patent No.: US 9,836,189 B2
(45) Date of Patent: Dec. 5, 2017

(54) SYSTEM AND METHOD OF INTER-WIDGET COMMUNICATION

(71) Applicant: Excalibur IP, LLC, New York, NY (US)

(72) Inventors: Gary Clayton, Daly City, CA (US); Victor Chen, Saratoga, CA (US); Athellina Athsani, San Jose, CA (US); Ronald G. Martinez, San Francisco, CA (US)

(73) Assignee: Excalibur IP, LLC, New York, NY (US)

( * ) Notice: Subject to any disclaimer, the term of this patent is extended or adjusted under 35 U.S.C. 154(b) by 217 days.

(21) Appl. No.: 13/717,300

(22) Filed: Dec. 17, 2012

(65) Prior Publication Data
US 2013/0219313 A1    Aug. 22, 2013

Related U.S. Application Data

(62) Division of application No. 11/853,781, filed on Sep. 11, 2007, now Pat. No. 8,352,966.

(51) Int. Cl.
*G06F 3/0484* (2013.01)
*G06F 9/54* (2006.01)

(52) U.S. Cl.
CPC ............ *G06F 3/0484* (2013.01); *G06F 9/542* (2013.01); *G06F 2209/545* (2013.01)

(58) Field of Classification Search
CPC ............................... G06F 3/0484; G06F 9/542
USPC ................ 715/744–747, 749, 771, 808, 963; 705/7.24; 455/556.2
See application file for complete search history.

(56) References Cited

U.S. PATENT DOCUMENTS

| | | | |
|---|---|---|---|
| 5,710,574 A | 1/1998 | Jaaskelainen, Jr. | |
| 5,732,228 A | 3/1998 | Jaaskelainen, Jr. | |
| 5,805,159 A * | 9/1998 | Bertram et al. | ............... 715/764 |
| 5,896,532 A | 4/1999 | Blewett | |
| 6,237,004 B1 | 5/2001 | Dodson et al. | |
| 7,269,792 B2 | 9/2007 | Consolatti et al. | |
| 7,479,949 B2 | 1/2009 | Jobs et al. | |
| 7,657,281 B2 * | 2/2010 | Eibye | .......................... 455/550.1 |
| 7,707,514 B2 * | 4/2010 | Forstall et al. | ............... 715/810 |
| 7,752,556 B2 | 7/2010 | Forstall et al. | |

(Continued)

FOREIGN PATENT DOCUMENTS

| | | |
|---|---|---|
| WO | 2009/036093 A2 | 3/2009 |
| WO | 2009/036093 A3 | 7/2010 |

OTHER PUBLICATIONS

Bajaj, C. et al., "Web based collaborative visualization of distributed and parallel simulation", In: Parallel Visualization and Graphics Symposium,1999, Proceedings, 1999 IEEE, ISBN: 0/7803-5901-1,pp. 47-54.

(Continued)

*Primary Examiner* — Andrew Tank
(74) *Attorney, Agent, or Firm* — Martine Penilla Group, LLP

(57) ABSTRACT

A method and apparatus enabling inter-widget communication and control uses a central server to receive selected widgets and settings associated with at least one widget, wherein the received settings are used to at least partly determine the settings of the other selected widgets according to a pre-defined relationship between or among the widgets.

21 Claims, 3 Drawing Sheets

(56) References Cited

U.S. PATENT DOCUMENTS

| | | | |
|---|---|---|---|
| 7,756,722 B2 * | 7/2010 | Levine et al. | 705/2 |
| 7,778,792 B2 | 8/2010 | Huang et al. | |
| 7,849,413 B2 | 12/2010 | Hirota et al. | |
| 7,873,908 B1 | 1/2011 | Varanasi et al. | |
| 7,917,858 B2 * | 3/2011 | Pereira et al. | 715/762 |
| 7,984,384 B2 | 7/2011 | Chaudhri et al. | |
| 8,055,705 B2 * | 11/2011 | Ng et al. | 709/203 |
| 8,190,359 B2 * | 5/2012 | Bourne | 701/410 |
| 8,352,966 B2 | 1/2013 | Clayton et al. | |
| 8,640,034 B2 * | 1/2014 | Bergman | H04L 41/22 707/999.104 |
| 8,924,869 B2 * | 12/2014 | Fellman | 715/762 |
| 2004/0216042 A1 | 10/2004 | Consolatti et al. | |
| 2006/0117267 A1 * | 6/2006 | Koralski | G06F 9/4443 715/767 |
| 2006/0174202 A1 * | 8/2006 | Bonner | G06F 9/4443 715/750 |
| 2006/0271885 A1 | 11/2006 | Pittendrigh et al. | |
| 2007/0078953 A1 | 4/2007 | Chai et al. | |
| 2007/0101291 A1 * | 5/2007 | Forstall et al. | 715/805 |
| 2008/0010130 A1 * | 1/2008 | Pyhalammi et al. | 705/14 |

OTHER PUBLICATIONS

Moll!, P. et al.,"State Treemap: an awareness widget for multi-synchronous groupware", In: Groupware, 2001. Proceedings. Seventh International Workshop on Sep. 6-8, 2001, ISBN: 0/7695-1351-4, pp. 106-114.

"Adobe Apollo = Acrobat Reader + Flash Player", retrieved from <http://labnol.blogspot.com/2005/12/adobe-apollo-acrobat-reader-flash.html>, Retrieved: Jun. 14, 2012, 7 pages.

International Preliminary Report on Patentability received for PCT Patent Application No. PCT/US2008/075896, dated Jun. 24, 2010, 5 pages.

International Search Report and Written Opinion received for PCT Patent Application No. PCT/US2008/075896, dated Apr. 8, 2009, 5 pages.

Microsoft Sidebar for Windows Vista Beta 2; Gadget Development Overview; <http://microsoftgadgets.com/Sidebar/>Development overview .aspx; (last visited:Sep. 11, 2007).

SpringWidgets-Beta;<http://thespringbox.com/download/> (last visited: Sep. 11, 2007).

Pageflakes; <http:pageflakes.com> (last visited: Sep. 11, 2007).

* cited by examiner

SYSTEM AND METHOD OF INTER-WIDGET COMMUNICATION

CROSS-REFERENCE TO RELATED APPLICATION(S)

This application is a division of U.S. patent application Ser. No. 11/853,781, filed on Sep. 11, 2007, now allowed, which is incorporated by reference herein in its entirety.

BACKGROUND

1. Field of the Invention

Aspects of the present invention relate generally to the ability of widgets to communicate with other widgets and dynamically build their content based on the communication.

2. Description of Related Art

As is known in the art, widgets (also known as gadgets, badges, modules, etc.) offer a simple and easy way for end users to embed various third-party functionality into their web pages, onto their computers, and even onto their mobile devices, including mobile phones, Personal Digital Assistants (PDAs), etc. Widgets may be used to display most anything and examples include modules that show the weather forecast for a particular city or the current stock price of a certain company, etc. The inclusion of a widget in a web page can be accomplished through a JavaScript™ call, an IFRAME element, an EMBED element, or any of a host of other methods which bring the widget code into the web page, where it runs locally within the user's browser (or on a user's desktop, etc.). While the widget code can consist entirely of HyperText Markup Language (HTML), widgets are more commonly developed either in JavaScript™ or Adobe® Flash®.

Traditionally, the content displayed by widgets has been fairly static and is generally limited to data which has been informed by a user's initial input when configuring the widget (e.g., telling a widget that displays weather information to display information related to Orlando, Fla., etc). Moreover, widgets have been generally independent from each other and cannot share content. For example, Yahoo!™ Finance offers a customizable widget for displaying financial information, which can include stock quotes. If a user decides he wants the widget to show stock quotes for a certain stock, he tells the widget which stock he is interested in and from that point on it will display those stock quotes. The widget will display only those stock quotes until the user tells it to display something else; the widget is informed only by the last settings that the user has provided.

Thus, it would be desirable to enable widgets to share information between them and use that information to inform their content. It would also be desirable to control when the widget actually appears on a web page or desktop so that it does not take up valuable space when it is not needed or desired.

SUMMARY

In light of the foregoing, it is a general object of the present invention to generate a widget's content by taking into account the content of other, related widgets.

It is another object of the invention to control the timing and duration of a widget's display on a web page or desktop.

BRIEF DESCRIPTION OF THE DRAWING FIGURES

DETAILED DESCRIPTION

Figure 1:
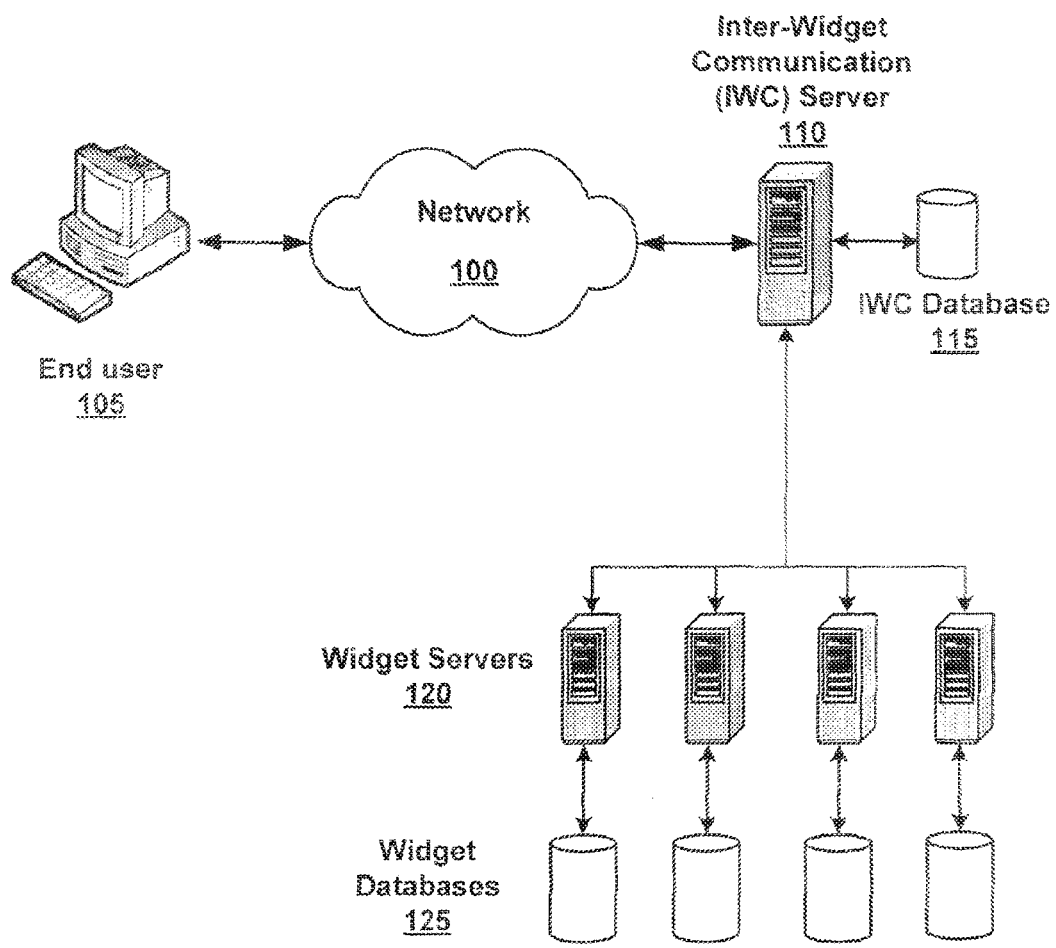
FIG. 1 is a simplified functional block diagram of the general architecture of an exemplary embodiment of the present invention.

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of widgets and widget groups that can derive information from one another and use that information to inform their content.

FIG. 1 is a simplified functional block diagram of the general architecture of an exemplary embodiment of the present invention. An end user 105 interacts (using a computer, a mobile device, etc.), over a network 100 (e.g., the Internet), with Inter-Widget Communication (IWC) Server 110, which may control the data-sharing between the various widgets. IWC Database 115 may store the data-sharing characteristics and settings as entered by the user and processed by IWC Server 110. It will be appreciated by those of skill in the art that the functionality provided by IWC Server 110 and IWC Database 115 may be provided instead by the device used by end user 105 (e.g., computer, mobile phone, PDA, etc.). Widget Servers 120 and Widget Databases 125 may process information requests from IWC Server 110 and send the results back to IWC Server 110, to the widgets themselves, etc. The means through which IWC Server 110, Widget Servers 120, and related databases communicate are non-critical and can include the Internet, Local Area Networks (LANs), fiber, etc.

Inter-widget communication allows one or more widgets belonging to a widget "group," as defined by end user 105, to share their information with each other by referencing a functional relationship between them; the shared information may include the settings or content preferences that each widget requires for its operation (e.g., a weather widget may need to be told which geographic location to monitor, etc.). Further, widget groups may share information between them just as widgets can. In some circumstances, the widget group may share a common, informative goal (e.g., gather all desired information about a particular city, etc.). In one embodiment, the inter-widget communication can be managed and controlled by structuring the functional relationship between the selected widgets in a hierarchical fashion, with a "master" widget and one or more "retainer" widgets." In such a setup, the user chooses a widget to be the master and other widgets to be the retainers. Content preferences that are defined on the master widget "filter" down to the retainer widgets and inform their content, as outlined in more detail below.

Figure 2:
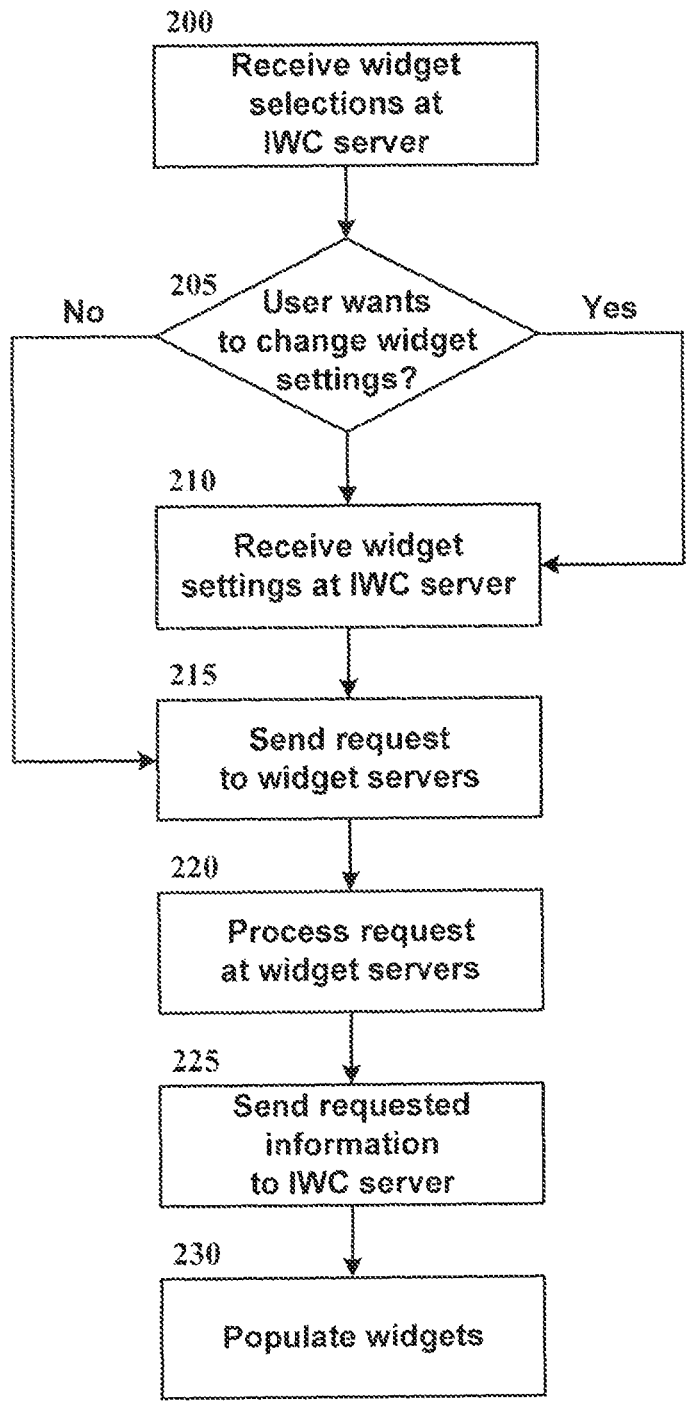
FIG. 2 is a logical flowchart of the general process by which widget hierarchies are set.

FIG. 2 is a logical flowchart of the general process by which widget hierarchies are set and widget content is generated. FIGS. 3A-3D show the hierarchical operations used to set up the widgets' master-retainer structure. The discussion of FIG. 2 and FIGS. 3A-3D is driven by a specific example below.

As illustrated at block 200, IWC Server 110 receives those widgets selected by a user to belong to the master-retainer group of [inter-related] widgets. For example, assume that the user is trying to decide on a vacation trip to an as yet undetermined location during a certain part of the year, and wishes to base her decision mainly on the cheapest airfare, but would also like to take a few other disparate things into consideration, such as, for example, world news, local news, and weather information for the competing locations. Given the user's goals and restrictions, she may want to choose various widgets to belong to a single group themed around travel (other examples of themes might include investment strategy, car shopping, etc.). These widgets might include those shown in FIG. 3A, namely 1.) "Best Fare Tracker" 300 to monitor the best ticket prices for the competing locations; 2.) "Weather" 305 for reporting the weather forecasts in the competing locations; 3.) "Top Reuters™ Stories" 310; and 4.) "World Reuters™ Stories" 315.

Figure 3A:
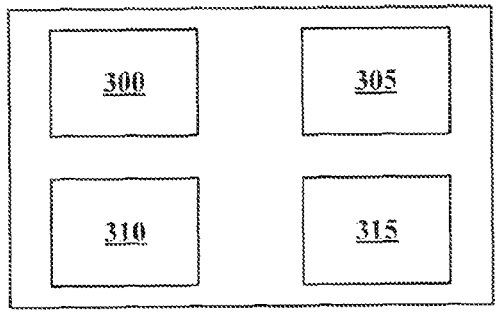
FIGS. 3A-3D show the hierarchical operations used to set up the widgets' master-retainer structure.
Figure 3B:
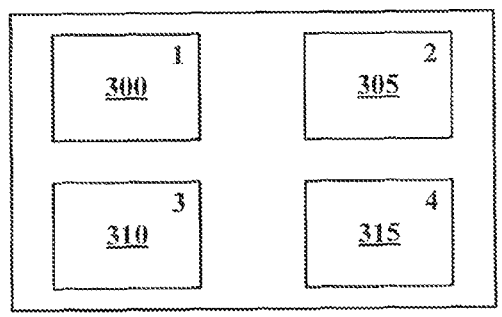
Figure 3C:
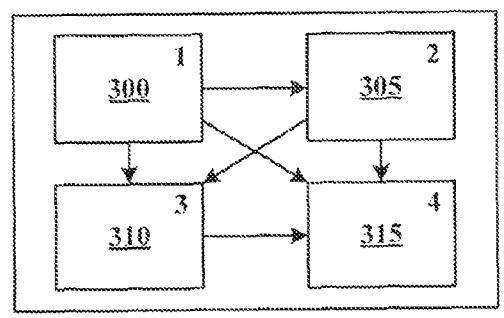

As illustrated at block 205, the user may specify the functional master-retainer relationships used to control the selected widgets (discussed more fully herein), as shown in FIG. 3B. For example, in this situation, because the cheapest airfare is the most important criterion, the user may make the Best Fare Tracker 300 the master widget, and set the remaining widgets up as retainers. FIG. 3B illustrates this functional relationship by assigning to each of the selected widgets a number (e.g., 1, 2, 3, or 4) specifying its position in the hierarchy. The master-retainer relationship may be of varying degrees of elasticity. For example, FIG. 3C illustrates rather 'strict' relationships between each of the widgets; Best Fare Tracker 300 is the master widget and so it influences the content of Weather 305, Top Reuters™ Stories 310, and World Reuters™. Stories 315, as shown by the arrows from Best Fare Tracker 305 to each of the retainer widgets. Similarly, if the retainer widgets do not have relevant content (i.e., content they can use to inform the content of other widgets), the second widget in the hierarchy can assume a "master" role and inform those widgets below it. Also, various and more complex functional relationships may be implemented between the widgets, such as, for example, two-way communication (i.e., the user may wish to have a widget from the 'middle' of the hierarchy influence widgets both above and below it). It also should be noted that while in this example the user has set airfares as the master criterion, the user could just as easily have set weather or local events as the master criterion.

Figure 3D:
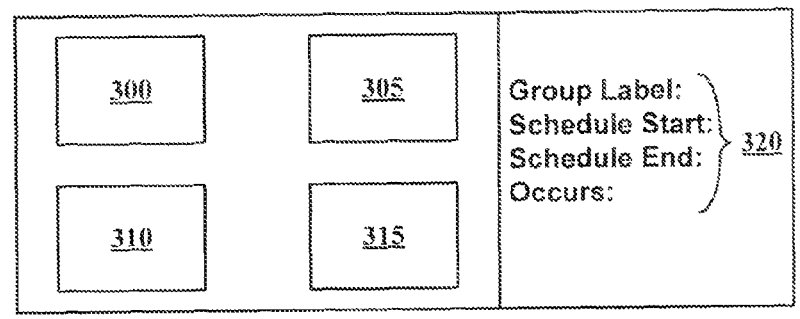

In one embodiment, the user may also be able to define "schedules" for each widget or widget group, as shown in FIG. 3D. Schedule settings 320 may allow the user to specify certain times during which a widget or widget group may appear, and with what frequency. For example, using the travel situation outlined above, the user may wish that the information regarding her travel plans only be shown on her web page or desktop for the next two weeks, and only after 6 PM, when she is out of the office and back home. In this case, the user would define start and end dates and start and end times-of-day. As another example, the user may wish for a traffic information widget to appear on her desktop or web page only between 4:30 PM and 5:30 PM each weekday, so that she can get the most recent traffic information regarding her route home; by defining a schedule and frequency in this way, the user's desktop or web page is not cluttered with useless traffic information (i.e., before 4:30 PM the information provided by the traffic widget is unusable) and the space can be more effectively utilized by, for example, other, more pertinent widgets. Where schedule and frequency settings are enabled, IWC Server 110 may take them into account when deciding which Widget Servers 120 need to be sent information requests; if the schedule and/or frequency settings disallow the to-be-requested information to be shown on the desktop or web page, then the requests may not be sent.

After these settings have been defined, IWC Server 110 may receive and "process" them at block 210, where processing may include various functions, including deciding what information to request from each of Widget Servers 120 based on the hierarchical structure defined by the user. For example, if Best Fare Tracker 300 has some influence over Weather 305, then IWC Server 110 may decide to request weather information from Weather 305 that corresponds to a location the user has specified in Best Fare Tracker 300. The processing functionality may also include the ability to determine whether a widget should display any information at all (as discussed above with reference to FIG. 3D).

After the settings have been processed, information requests may be sent to Widget Servers 120 at block 215. These information requests may work in a number of different ways, depending how Widget Servers 120 are configured.

In one embodiment, Widget Servers 120 may be configured to handle general requests as they normally would (i.e., those requests as would usually come from the widgets they "power"). In that case, the information requests may simply be "custom" or "automated" versions of the requests that would be sent by the widgets themselves. For example, Weather 305 may reside on a user's web page and the user may specify a geographic location for Weather 305 to monitor. Each time Weather 305 updates its information (e.g., once an hour, on every page load, etc.) it must send a request to Widget Server 120. The "custom" or "automated" requests sent by IWC Server 110 (instead of the widgets themselves) may be substantially similar to those usually sent by individual widgets; Widget Server 110 would treat the requests the same no matter how they were carried out (as expounded on below). In one implementation, and still referencing Weather 305, Widget Server 120 may simply supply eXtensible Markup Language (XML)-based feeds (e.g., RSS, Atom, etc.) corresponding to all requested locations and combinations of locations, which are read by Weather 305 using various protocols, such as, for example, the HyperText Transfer Protocol (HTTP), etc. In another implementation, Widget Servers 120 may offer an Application Programming Interface (API) for accessing its information; in such a case, Weather 305 may perform an API call over, for example, the Internet, where it may be received, processed, and responded to by Widget Server 120. Irrespective of how the information is ultimately requested by Weather 305 and received/processed by Widget Server 120, IWC Server 110 may mimic the information request so as to allow Widget Server 120 to operate in substantially the same way it has always operated.

In another embodiment, Widget Servers 120 may be configured in such a way as to offer increased functionality, speed, etc., to those information requests coming from IWC Server 110. For example, Widget Servers 120 may be made aware of some elements of the hierarchical structure used by IWC Server 110 and, in light of this information, may treat a particular request from IWC Server 110 differently than if it had come from an individual widget. As another example, Widget Servers 120 may accept [different] arguments, etc., to information requests if they come from IWC Server 110; such arguments may be used to specify that only a certain amount of data be returned (e.g., only show weather information for the next three days, not an entire week, etc.), or may put a further restriction on the content of the returned data (e.g., only show weather information for location two if it is raining for the next three days at location one, etc.), etc. In such an embodiment, there may exist two separate Widget Servers 120, one for each type of requester (i.e., individual or IWC Server).

Irrespective of the form the information requests take, they are ultimately received and processed by Widget Servers 120, as illustrated at block 220. As discussed in some detail above, Widget Servers 120 parse the information requests and return the data asked of them. For example, an information request for the current weather information at a particular location may be received by Widget Servers 120, in which case the requested information may be compiled (or, as the case may be, the information may already be compiled) and returned. As illustrated at block 225, the requested information is sent from Widget Servers 120 to IWC Server 110.

IWC Server 110 receives the requested information from Widget Servers 120 at block 230. After each of Widget Servers 120 has responded with the requested information, IWC Server 110 may process the information and populate the widgets accordingly. Alternatively, IWC Server 110 may simply act as a "proxy" for the information requests, and in this case, the widgets may be populated by Widget Servers 120 directly; the requested information does not necessarily need to go back through IWC Server 110 before it is received by the widgets.

The hierarchical, master-retainer relationship structure may be set in a number of different ways. In one embodiment, the structure may be defined through a drag-and-drop interface through which the user can choose the widgets to belong to a widget group, and also the relationships among the widgets. For example, the user may be shown a list of available widgets (e.g., a list of widget names, list of previews of the widgets, etc.) and a list of sequential numbers (to represent the levels of the hierarchy); by dragging a widget to a particular number, dragging a number to a particular widget, etc., the user can define the hierarchical structure. As another example, there may be a form next to each available/selected widget where the user can enter a number to specify its position in the hierarchy.

Those of skill in the art will appreciate that the concept of inter-widget communication is not limited to the ideas outlined above. For example, a widget's content does not necessarily have to be informed by another widget, but may in fact be informed by a host of various things (other than an end user). As an example, some Internet companies offer "home" pages (also known as "portals," etc.) that allow users to define their content. That content can sometimes include various widgets as chosen by the user. In many cases, the home page also contains search functionality to allow the user to search the Internet at large, or the particular Internet company's site, etc. In such a situation, the widgets selected by the user could be informed by the terms of their latest search, such that the results page(s) will show not only the regular search results, but also the information received by the various widgets, whose content has been informed by the search terms. For example, a user may search for "Orlando Florida," and in addition to the regular search results, may receive weather information supplied by a weather widget displayed next to the search results.

The sequence and numbering of blocks depicted in FIG. 2 is not intended to imply an order of operations to the exclusion of other possibilities. It will be appreciated by those of skill in the art that the foregoing systems and methods are susceptible of various modifications and alterations. For example, instead of returning the requested information to IWC Server 110 at block 225, Widget Servers 120 may send the information directly to the widgets themselves. As another example, the reception and processing of the hierarchical and schedule settings at block 210 may take place at the user's device (e.g. computer, mobile phone, PDA, etc.) and not necessarily at IWC Server 110.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of controlling when widgets are displayed, as a function of when their display is requested, said method comprising:

assigning a plurality of widgets to a widget group, wherein the widgets of the widget group have a functional relationship with one another, the functional relationship enables sharing of information between the widgets of the widget group, the shared information allows selection and control of content rendered in the respective widgets of the widget group, wherein the functional relationship between the widgets is structured in a hierarchical fashion to manage and control inter-widget communication, the hierarchical structure enables sharing at least a portion of widget settings of one widget in the widget group with other widgets in the widget group, so as to affect content presented in the other widgets, wherein the hierarchical structure defined by the functional relationship is configured to assign a second widget in the hierarchical structure to share the portion of the widget settings with the other widgets in the widget group, when the other widgets in the widget group do not have relevant content for rendering for the portion of the widget settings shared by the one widget, the assignment of the second widget causing adjustment to the portion of the widget settings that influence content presented by the other widgets on both sides of the hierarchical structure of the widget group;

defining a durational period to display the widgets from the widget group; and determining whether the widgets from the widget group should be displayed in response to a display request.

2. The method of claim 1, wherein the one widget sharing the portion of the widget settings is a master widget.

3. The method of claim 1, wherein the durational period comprises a start date and an end date and wherein said determining checks whether a date associated with the display request is within the start date and end date.

4. The method of claim 3 wherein the durational period further comprises a frequency value, the frequency value comprises a start time and an end time.

5. The method of claim 1, wherein the sharing of information is enabled by implementing a two-way communication between the widgets of the widget group.

6. The method of claim 4 wherein the widget group is displayed if the date associated with the display request is within the durational period and a time associated with the display request is within a range defined by the start time and the end time of the frequency value.

7. The method of claim 1 wherein the widgets comprising the widget group share a common theme.

8. The method of claim 1, further comprising:
determining whether to send information requests to widget servers based on the durational period.

9. The method of claim 8, wherein the durational period comprises at least a start date and an end date;
wherein the information requests are sent if a date associated with the display request is within the durational period; and
wherein the information requests are not sent if the date associated with the display request is not within the durational period.

10. The method of claim 1, wherein the second widget is a master widget.

11. A system for controlling when widgets are displayed, as a function of when their display is requested, said system comprising:
at least one server configured to receive an assignment of a plurality of widgets to a widget group, wherein the widgets of the widget group have a functional relationship with one another, the functional relationship enables sharing of information between the widgets of the widget group, the shared information allows selection and control of content rendered in the respective widgets of the widget group,
wherein the functional relationship between the widgets is structured in a hierarchical fashion to manage and control inter-widget communication, the hierarchical structure enables sharing at least a portion of widget settings of one widget in the widget group with other widgets in the widget group, so as to affect content presented in the other widgets,
wherein the hierarchical structure defined by the functional relationship is configured to assign a second widget in the hierarchical structure to share the widget settings with the other widgets in the widget group, when the widgets in the widget group do not have relevant content for rendering for the portion of the widget settings shared by the one widget, the widget settings of the second widget affecting content presented by the other widgets on both sides of the hierarchical structure of the widget group;
wherein the at least one server is further configured to receive a durational period to display the widgets from the widget group; and
wherein the at least one server is further configured to determine whether the widgets from the widget group are to be displayed in response to a display request.

12. The system of claim 11 wherein the durational period comprises a start date and an end date.

13. The system of claim 12 wherein the at least one server checks whether a date associated with the display request is within the start date and end date.

14. The system of claim 11 wherein the durational period further comprises a frequency value, the frequency value comprises a start time and an end time.

15. The system of claim 14 wherein the widget group is displayed in response to the date associated with the display request being within the durational period and a time associated with the display request being within a range defined by the start time and the end time of the frequency value.

16. The system of claim 11 wherein the widgets comprising the widget group share a common theme.

17. The system of claim 11 wherein the at least one server is further configured to determine whether to send a plurality of information requests to at least one widget server based on the durational period.

18. The system of claim 17, wherein the durational period comprises at least a start date and an end date;
wherein the at least one server is configured to send the plurality of information requests in response to a date associated with the display request being within the durational period; and
wherein the at least one server is configured to not send the plurality of information requests in response to the date associated with the display request not being within the durational period.

19. A method of controlling when widgets are displayed, as a function of when their display is requested, said method comprising:
assigning a plurality of widgets to a widget group, the widgets in the widget group having a functional relationship with one another, the functional relationship enables sharing of information between the widgets of the widget group, the shared information allows selection and control of content rendered in the respective one of the plurality of widgets of the widget group, wherein the functional relationship between the widgets is structured in a hierarchical fashion to manage and control inter-widget communication and to allow content preferences to be shared amongst widgets in the widget group, wherein the structuring in the hierarchical fashion includes,
assigning one widget from among the plurality of widgets to be a master widget, the master widget sharing at least one widget setting with other widgets in the widget group, so as to affect content presented in the other widgets;
when the other widgets in the widget group do not have relevant content for rendering for the at least one widget setting of the master widget, assigning a second widget in the hierarchical structure to be the master widget, the widget setting of the second widget shared with the other widgets on both sides of the hierarchical structure so as to affect content presented by the other widgets of the widget group;
defining a durational period that includes a start date, an end date, a start time, and an end time to display the widgets from the widget group; and
determining whether the widgets from the widget group are to be displayed in response to the display request based on the durational period.

20. The method of claim 19 wherein determining whether the widget group is to be displayed comprises:
determining whether a date associated with the display request is within a date range defined by the start date and the end date; and
determining whether a time associated with the display request is within a time range defined by the start time and the end time;
wherein the method further comprises:
displaying the widget group if the date associated with the display request is within the date range and if the time associated with the display request is within the time range; and
not displaying the widget group if at least one of the date associated with the display request is not within the date range or the time associated with the display request is not within the time range.

21. The method of claim 19, wherein assigning defines a hierarchy within the widgets of the widget group, the assigning further includes, when the remaining ones of the plurality of widgets in the widget group do not have relevant content for the at least one setting shared by the master widget, assigning a second widget in the hierarchy to become a new master widget and allowing the second widget to share at least one setting with other widgets of the widget group, so as to affect content rendering in the other widgets of the widget group.

\* \* \* \* \*